Figure 1:
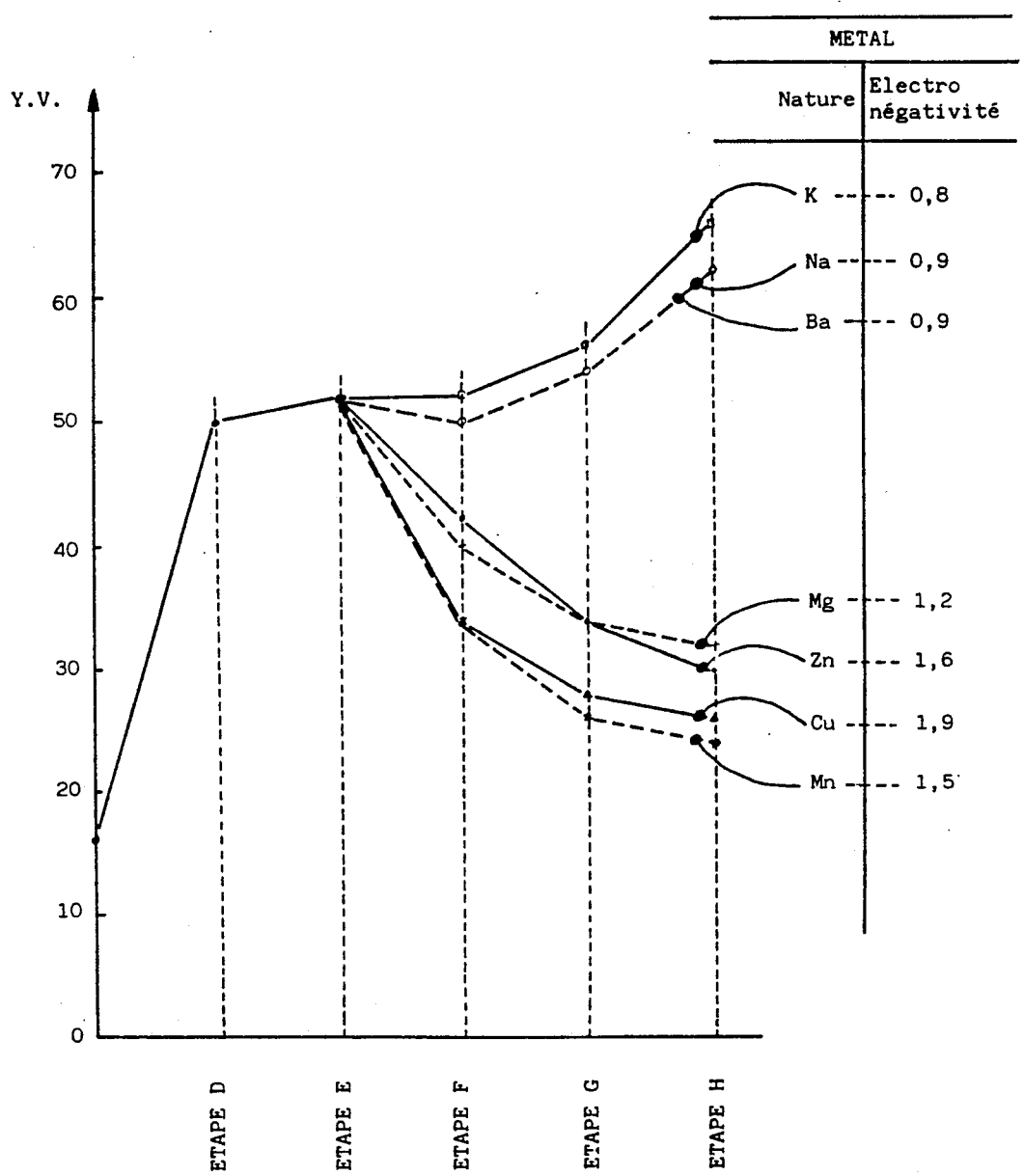

United States Patent [19]

Bouchut et al.

[11] Patent Number: 5,099,928
[45] Date of Patent: Mar. 31, 1992

[54] NON-POLLUTING DISPERSING AGENT FOR DRILLING FLUIDS BASED ON FRESHWATER OR SALT WATER

[75] Inventors: Pierre Bouchut, Decines; Yves Kensicher, Oullins; Jacky Rousset, St Trivier-sur-Moignans, all of France

[73] Assignee: Coatex S.A., Caluire, France

[21] Appl. No.: 553,345

[22] Filed: Jul. 16, 1990

Related U.S. Application Data

[63] Continuation of Ser. No. 433,444, Nov. 9, 1989, abandoned, which is a continuation of Ser. No. 143,230, Jan. 6, 1988, abandoned, which is a continuation of Ser. No. 829,327, Feb. 14, 1986, abandoned.

[30] Foreign Application Priority Data

Feb. 19, 1985 [FR] France .................................. 85 02534

[51] Int. Cl.$^5$ ............................................. C09K 7/02
[52] U.S. Cl. ...................................... 175/57; 524/556; 526/240; 526/241; 526/317.1; 507/117; 507/118; 507/119; 507/120; 507/121; 507/122; 507/123; 507/125; 507/905
[58] Field of Search ............... 524/556; 526/317.1, 526/240, 241; 252/8.511, 8.514; 175/57

[56] References Cited

U.S. PATENT DOCUMENTS

| | | | |
|---|---|---|---|
| 2,502,411 | 4/1950 | Neher et al. | 526/241 |
| 4,093,776 | 6/1978 | Aoki et al. | 526/240 |
| 4,118,441 | 10/1978 | LeBlanc | 252/8.511 |
| 4,173,555 | 11/1979 | Phillips | 526/241 |
| 4,187,353 | 2/1980 | Schroeder | 521/149 |
| 4,288,582 | 9/1981 | Lucas et al. | 526/240 |
| 4,364,924 | 12/1982 | Gander et al. | 526/240 |
| 4,425,461 | 1/1984 | Turner et al. | 252/8.514 |
| 4,425,462 | 1/1984 | Turner et al. | 252/8.514 |
| 4,451,389 | 5/1984 | Clear | 252/8.511 |
| 4,554,018 | 11/1985 | Allen | 526/240 |
| 4,554,307 | 11/1985 | Farrar et al. | 252/8.511 |
| 4,562,234 | 12/1985 | Besecke et al. | 526/241 |

FOREIGN PATENT DOCUMENTS 0013836 8/1980 European Pat. Off. .

*Primary Examiner*—Charles L. Bowers, Jr.
*Assistant Examiner*—Lee C. Wright
*Attorney, Agent, or Firm*—Oblon, Spivak, McClelland, Maier & Neustadt

[57] ABSTRACT

A non-polluting dispersing agent for drilling fluids based on soft water or salt water.

A dispersing agent for aqueous drilling fluids, optionally saline, belonging to the group of polymers and/or copolymers containing acid functions which is characterized in that, to ensure that these fluids retain their rheological characteristics, even under the extreme temperature and pressure conditions prevailing in deep bore holes, said dispersing agent is a salt of said polymers and/or copolymers of which the salifying cation corresponds to a metal having a Pauling electronegativity at least equal to 0.95 and preferably greater than 1.

14 Claims, 1 Drawing Sheet

NON-POLLUTING DISPERSING AGENT FOR DRILLING FLUIDS BASED ON FRESHWATER OR SALT WATER

This application is a continuation of application Ser. No. 07/433,444, filed on Nov. 9, 1989, now abandoned, which is a continuation of Ser. No. 07/143,230 filed on Jan. 6, 1988, now abandoned which is a continuation of Ser. No. 06/829,327 filed on Feb. 14, 1986 now abandoned.

This invention relates to a non-polluting and effective dispersing agent for aqueous suspensions of mineral materials based on fresh or salt water of the type commonly used as drilling fluids in civil engineering, building, public works, oil and water prospecting and extraction and mineral deposits.

The invention also relates to the drilling fluids in which the dispersing agent is used.

In the context of the invention, drilling fluids are broadly understood to include any aqueous suspensions of mineral materials, such as for example soft bentonite muds, lime muds, gypsum muds, saturated saline muds and seawater muds.

It has long been known among experts that the use of drilling muds in the fields of civil enginnering, building, public works, oil and water prospecting and production and mineral deposits, frequently involves considerable and troublesome problems in practice through the changes in their rheological characteristics. The reason for this is that, as the drilling mud passes through very different geological formations, the rheological characteristics initially acquired during its development are very often affected, for example, by the constituent mineral materials of the layers through which it passes or even by inputs of freshwater and/or salt water.

The on-site user then experiences inconveniences, such as an increase in the viscosity of the muds, which are unacceptable to him because they affect both the drilling time and the production costs. Accordingly, experts have long sought to improve the composition of drilling muds by the introduction of chemical substances which provide them with fluids having the most stable possible rheological characteristics so that their behavior in use would be more regular and reproducible, even under the temperature and pressure conditions involved in drilling to increasingly greater depths.

To the expert, the ideal drilling mud would be one having the following properties: first, such rheological characteristics that it could carry the mineral wastes suspended in situ, although some of them could contaminate the mud; secondly, the ability to enable the wastes to be separated by any known means after removal of the drilling mud from the shaft; thirdly, a density such that it could exert sufficient pressure on the geological formations being drilled; finally, the ability to retain its basic rheological qualities when subjected to increasingly higher temperatures in deep drilling operations. It is for this reason that experts have introduced chemical additives of mineral and/or organic origin into aqueous drilling muds containing colloidal mineral materials, such as swelling clays, particularly bentonites and attapulgites, mineral densifying materials, such as for example baryta, calcium carbonate, ilmenite, in an attempt to provide them with maximal stability irrespective of the geological formation being drilled.

Thus, aqueous drilling muds contain the constituent elements which are, essentially, the aqueous phase (freshwater or salt water), optionally a clay and/or a viscosity-imparting polymer, a filtrate reducing agent, which may be a polymer, a dispersing agent which enables the viscosity of the mud to be lowered as it becomes charged with clay and, finally, a densifying agent.

Although various attempts have been made to reduce the disadvantages mentioned above by influencing the various constituent elements of a mud, the specialist literature is particularly concerned with dispersing agents. It cites as a common practice the addition of at least one dispersing agent to drilling muds in order to keep their rheological characteristics as stable as possible while they are in use during drilling.

Thus, it has appeared desirable to regulate the viscosity of drilling muds to a value selected by the user either by keeping it at a value similar to its initial value or by returning it to that initial value after an excessive increase during the period of its use. The dispersing agents described in the specialist literature and used hitherto are of many different origins.

The phosphates or polyphosphates which perform a dispersing function in the drilling mud cause a defloccu- lation of colloidal clay and enable a mud of higher density and lower viscosity to be used whilst, at the same time, ensuring a certain reduction of the filtrate. However, a major disadvantage of phosphates and polyphosphates is that they are generally unstable, even at low temperatures, such as 50° C. for example, and beyond those temperatures their stabilizing function diminishes or even disappears altogether.

Similarly, the lignin used in aqueous drilling fluids has the reputation of controlling the thixotropy of these fluids. However, the introduction of contaminating agents into the fluid during drilling, such as NaCl, $CaSO_4$, causes its progressive precipitation, thus making it ineffective. In view of the disadvantages mentioned above, lignosulfates in the form of salts of calcium, sodium, iron, chromium or iron and chromium together have been used as dispersing agents in drilling fluids, i.e. to stabilize their viscosity to the value required by the user. However, it is well known that sodium and calcium lignosulfates are poor viscosity stabilizers whilst the chromium or iron/chromium lignosulfates which have replaced them are significant sources of environmental pollution, necessitating a reduction in their use, although these stabilizers are among the best to date because they remain acceptably effective, even at temperatures of the order of 150° C. at the bottom of the bore hole.

Other chemical additives have been proposed in the specialist literature with a view to performing a specific function in drilling fluids. Thus, U.S. Pat. No. 3,730,900 suggests using a copolymer of maleic anhydride and styrene sulfonic acid as a colloidal stabilizing agent. Now, although this colloidal stabilizing agent seems to act in an interesting way in drilling fluids, its synthesis which involves various steps in a solvent medium makes it difficult to obtain on an industrial scale.

Other low molecular weight polymers or copolymers containing hydroxamic or thiohydroxamic functions are proposed in FR-PS 2 476 113 as dispersants which are absorbed onto the clay particles. Unfortunately, this agent has a major disadvantage of only being effective at very high temperatures. Finally, the Article "High Temperature Stabilization of Drilling Fluids with a Low Molecular Weight Copolymer" published in "Journal of Petroleum Technology", June 1980, reports that the alkali salts of polyacrylic acids are ineffective as dispersing agents in media containing electrolytes because they are far too sensitive to the alkaline earth ions present in the drilling muds as a result of contamination.

Thus, the prior art provides the expert with solutions which are not totally satisfactory because the dispersing agents recommended are often disappointing. This is because their action is weakened either by the presence of troublesome mineral compounds, such as for example NaCl, CaSO$_4$, or by the changes in temperature at the bottom of the bore hole or even because they become ineffective or are completely inhibited when they are used in a drilling fluid of which the aqueous phase is salt water and, finally, because they may have a polluting effect on the environment.

With the above-mentioned disadvantages in mind, Applicants—continuing their research—have now found and perfected a non-polluting dispersing agent which is extremely effective at any in-use temperature both in light and in heavy muds.

The dispersing agent according to the invention, which belongs to the group of polymers and/or copolymers containing acid functions, intended for optionally saline, aqueous drilling fluids is characterized in that, to ensure that these fluids retain their rheological characteristics, even under the extreme temperature and pressure conditions prevailing in deep bore holes, said dispersing agent is a salt of said polymers and/or copolymers of which at least one salifying cation corresponds to a metal having a Pauling electronegativity at least equal to 0.95 and preferably greater than 1.

As revealed in the prior-art literature, research relating to dispersing agents for drilling fluids has hitherto been concerned with improving organic molecules of the polymer and/or copolymer type containing acid functions neutralized by standard neutralizing agents because they are the easiest to use, such as for example sodium hydroxide, potassium hydroxide, ammonia.

In addition and as already mentioned, the prior art describes the troublesome character of polyvalent cations, such as for example Ca$^{2+}$, Mg$^{2+}$, with respect to the effectiveness of the low molecular weight alkaline polymers used as dispersing agents for aqueous drilling muds.

Now, Applicants have shown in the course of their research that the nature of the cation used for salifying the acid functions of the polymers and/or copolymers was fundamental for obtaining the dispersing effect in the drilling muds, this effect being greater, the higher the elctronegativity of the salifying metal. This phenomenon remained true even for the polyvalent cations which are described as troublesome in the prior art, such as calcium, magnesium, manganese, i.e. which are known to cause a change of state of the treated medium.

Applicants have also shown that the effect of the cation corresponding to a metal having an electronegativity at least equal to 0.95 and preferably greater than 1 is more visible, the higher the density of the mud used, irrespective of the densifying agent used, such as for example calcium carbonate, barium sulfate, etc.

Thus, comparative analysis of the prior art relating to conventional dispersing agents for drilling muds and of the experimental results obtained in the course of Applicants' research in this field confirms that the polymer and/or copolymer is only one component of the thinner the other component which fundamentally enhances the dispersing effect being at least one cation corresponding to a metal having an electronegativity at least equal to 0.95 and preferably greater than 1, the dispersing effect being stronger, the higher the electronegativity of said element.

Now, Applicants have found that the polymers and/or copolymers supporting the active dispersing element according to the invention must have an acid character, i.e. must contain at least one acid function, such as for example of the carboxylic, hydroxamic, sulfuric, sulfonic, phosphoric or phosphonic type.

The polymers and/or copolymers intended to be used in accordance with the invention emanate from the polymerization of at least one of the monomers or comonomers containing acid functions or capable of generating such functions, such as for example acrylic and/or methacrylic, itaconic, crotonic, fumaric acid, maleic anhydride or even isocrotonic acid, aconitic acid, mesaconic acid, sinapic acid, undecylenic acid, angelic acid, hydroxyacrylic acid, acrolein, vinylsulfonic acid, acrylamidoalkylsulfonic acid, sulfuric esters and/or phosphoric esters of the acrylates and methacrylates of alkylene glycol, optionally in conjunction with acrylamide, acrylonitrile, esters of acrylic and methacrylic acid, particularly dimethylaminoethylmethacrylate, vinyl pyrrolidone and vinyl caprolactam, ethylene, propylene, isobutylene, diisobutylene, vinyl acetate, styrene, α-methylstyrene, methylvinylketone.

The polymers and/or copolymers used as support for the cation corresponding to a metal having an elcctronegativity at least equal to 0.95 and preferably greater than 1 are obtained by polymerization or copolymerization of the above-mentioned monomers by known methods in the presence of known initiators and regulators, the reaction being carried out in aqueous, alcoholic, aqueous-alcoholic, aromatic or aliphatic medium. Thus, the polymerization medium may be water, methanol, ethanol, propanol, isopropanol, butanols, dimethylformamide, dimethylsulfoxide, tetrahydrofuran, acetone, methylethylketone, ethylacetate, butylacetate, hexane, heptane, benzene, toluene, xylene, mercaptoethanol, tert.-dodecyl mercaptan, thioglycolic esters, n-dodecyl mercaptan, acetic acid, tartaric acid, lactic acid, citric acid, gluconic acid, glucoheptonic acid, 2-mercaptopropionic acid, thiodiethanol, carbontetrachloride, chloroform, methylene chloride, methylchloride, esters and/or ethers of monopropylene glycol, ethylene glycol.

The acid polymers and/or copolymers intended to be used as support for the active cationic element according to the invention generally have a specific viscosity at most equal to 9. However, it may be desirable to select said polymers and/or copolymers from those having specific viscosities in the range of from 0.2 to 3 and preferably in the range of from 0.3 to 1.5.

On completion of polymerization, the polymer in solution is at least partially salified by at least one salifying agent of which the cation corresponds to a metal having an electronegativity at least equal to 0.95 and preferably greater than 1.

Accordingly, the salifying cation is generally selected from metals having an electronegativity in the range of from 1.0 to 2.0 and preferably in the range of from 1.2 to 1.9.

Metals having an electronegativity at least equal to 0.95 and preferably greater than 1 which are suitable for use as dispersing agents in accordance with the invention include lithium, calcium, aluminium and preferably, magnesium, manganese, iron, zinc, copper.

The at least partial salification of the acid sites of the polymers and/or copolymers may also be obtained by combinations of cations of which at least one corresponds to a metal having an electronegativity at least equal to 0.95 and preferably greater than 1 and, desirably, within the above-mentioned ranges.

The degree of salification of the acid sites of said polymers and/or copolymers by at least one cation corresponding to a metal having an electronegativity at least equal to 0.95 and preferably greater than 1 is desirably at least 5% and preferably from 20% to 80%.

It is obvious, as Applicants have found, that the partial salification of the acid sites may be equivalently obtained by mixing suitable fractions of completely salified and completely acid polymers and/or copolymers.

In practice, the liquid phase emanating from polymerization and containing the acrylic, partially salified polymers and/or copolymers may be used in this form as dispersing agent for drilling muds, although it may also be treated by any known means to eliminate that phase and to isolate the partially salified polymers and/or copolymers in the form of a powder which may be used in this alternative form as dispersing agent.

The specific viscosity of the polymers and/or copolymers used in accordance with the invention, which is symbolized by the letter "$\eta$"$_{spec}$ determined as follows:

A solution of polymer and/or copolymer, 100% salified (degree of salification=1) with sodium hydroxide for the measurement, is pre-prepared by dissolving 50 g of dry polymer and/or copolymer in 1 liter of a solution of distilled water containing 60 g of NaCl. The flow time of a given volume of the above-mentioned solution containing the alkaline acrylic polymer and/or copolymer and the flow time of the same volume of an aqueous solution of sodium chloride free from said polymer and/or copolymer are then measured using a capillary viscosimeter placed in a bath thermostatically controlled to 25° C. It is then possible to define the specific viscosity "$\eta$"$_{spec}$ by the following relation:

$$\eta_{spec} = \frac{\text{(flow time of polymer solution)} - \text{(flow time of NaCl solution)}}{\text{flow time of NaCl solution}}$$

The capillary tube is generally selected so that the flow time of the NaCl solution free from polymer and/or copolymer is of the order of 90 to 100 seconds which provides for extremely accurate specific viscosity measurements.

The scope and advantages of the invention will become more clearly apparent from Examples 1 to 11 below.

In Examples 2 to 7, Applicants exaggerated the difficulties to the extreme by using highly viscous muds not normally encountered in drilling work in order clearly to illustrate the differences between the effective thinners (according to the invention) and ineffective thinners (prior art) when the muds had been densified.

EXAMPLE 1

This Example illustrates the preparation of acid homopolymers and copolymers belonging to the prior art and obtained by one of the radical polymerization processes well known to the expert in aqueous, aqueous-alcoholic or solvent medium in the presence of catalyst systems (peroxides, persalts) and transfer agents (alcohols, mercaptans) well known to the expert.

All these polymers (numbered from 1 to 7) and copolymers (numbered from 8 to 25) obtained by polymerization or commercially available (numbered 26 and 27: Alcomer 75L, marketed by Allied Colloids), dissolved in water to form solutions having a dry matter content of 41%, were completely or partly salified in the drilling muds by means of salifying agents of which the cation corresponded to a metal having an electronegativity at most equal to 0.9 for the prior art and at least equal to 0.95 and preferably greater than 1 for the invention, being within the broad electronegativity range of from 1.0 to 2.0 according to the Pauling tables published for example in the following works:

Notions Fondamentales de Chimie by D. H. ANDREWS and K. J. KOKES published by DUNOD Université 1968 (Table V - page 111).

Sargent-Welch Scientific Company, 4647 West-Foster Avenue, Chicago, Ill. - 60630.

Usuel de Chimie Générale et Minérale by M. BERNARD and F. BUSNOT, published by DUNOD - 1984 (Pages 98-99).

Similarly, the specific viscosities of the polymers were systematically established using the method described above.

Table I below lists the various dispersing agents used in the other examples in order to illustrate the invention and, above all, to compare it with the prior art.

In this Table, the acid functions which are not salified during preparation are subsequently salified by the sodium hydroxide present in the drilling mud.

TABLE I

| Thinner No. | Chemical composition of the polymer | Specific viscosity | Salifying agent Type | PAULING electronegativity of the metal | Degree of salification | Prior art (PA) Invention (INV) |
|---|---|---|---|---|---|---|
| 1 | Polyacrylic acid | 0.56 | NaOH | 0.9 | 100% | AA |
| 2 | | 0.56 | NaOH | 0.9 | 60% | AA |
| 3 | | 0.56 | Mg(OH)$_2$ | 1.2–1.3 | 20% | INV |
| 4 | | 0.56 | Mg(OH)$_2$ | 1.2–1.3 | 40% | INV |
| 5 | | 0.56 | Mg(OH)$_2$ | 1.2–1.3 | 60% | INV |
| 6 | | 0.80 | NaOH | 0.9 | 60% | AA |
| 7 | | 0.80 | Mg(OH)$_2$ | 1.2–1.3 | 60% | INV |
| 8 | Copolymer of (% by weight) Acrylic acid ... 70% | 0.72 | NaOH | 0.9 | 60% | AA |
| 9 | Acrylamide ... 30% | 0.72 | Mg(OH)$_2$ | 1.2–1.3 | 60% | INV |
| 10 | Copolymer of | 0.70 | NaOH | 0.9 | 100% | AA |
| 11 | (% by weight) | 0.70 | NaOH | 0.9 | 60% | AA |
| 12 | Acrylic acid ... 65% | 0.70 | Mg(OH)$_2$ | 1.2–1.3 | 60% | INV |

TABLE I-continued

| Thinner No. | Chemical composition of the polymer | Specific viscosity | Salifying agent Type | PAULING electro-negativity of the metal | Degree of salification | Prior art (PA) Invention (INV) |
|---|---|---|---|---|---|---|
| 13 | Acrylamide ... 15% | 0.70 | Mg(OH)$_2$ | 1.2–1.3 | 80% | INV |
| 14 | Phosphoric ester | 0.70 | Mg(OH)$_2$/Ca(OH)$_2$ | (1.2–1.3)/1.0 | 60%/40% | INV |
| 15 | of ethylene glycol | 0.70 | Mg(OH)$_2$/NaOH | (1.2–1.3)/0.9 | 60%/40% | INV |
| 16 | methacrylate ... 20% | 0.39 | NaOH | 0.9 | 60% | AA |
| 17 |  | 0.39 | Mg(OH)$_2$ | 1.2–1.3 | 60% | INV |
| 18 |  | 1.41 | Mg(OH)$_2$ | 1.2–1.3 | 60% | INV |
| 19 |  | 0.70 | KOH | 0.8 | 60% | AA |
| 20 |  | 0.70 | Ba(OH)$_2$ | 0.9 | 60% | AA |
| 21 |  | 0.70 | LiOH | 1.0 | 60% | INV |
| 22 |  | 0.70 | Ca(OH)$_2$ | 1.0 | 60% | INV |
| 23 |  | 0.70 | MnO | 1.5 | 60% | INV |
| 24 |  | 0.70 | Zn(OH)$_2$ | 1.6 | 60% | INV |
| 25 |  | 0.70 | Cu(OH)$_2$ | 1.9–2.0 | 60% | INV |
| 26 | Alcomer 75 L marketed by Allied Colloids | 0.51 | not known | — | 100 | AA |
| 27 | Alcomer 75 L, modified | 0.51 | Mg(OH)$_2$ | 1.2–1.3 | 60% | INV |

EXAMPLE 2

This Example illustrates the dispersing effect of the agents according to the invention by comparison with prior-art agents introduced into a drilling mud of which the aqueous phase was seawater and which had been prepared in a laboratory by the method comprising steps A to H below, the starting polymer being polyacrylic acid.

Step A

The base mud was prepared as follows by placing 500 ml of seawater (Mediterranean) in the bowl of a Hamilton Beach, adding 1.5 g (3 g/l) of Na$_2$CO$_3$ and then 12.5 g (25 g/l) of a bentonite (K) (yield 18 to 20 m$^3$/t, as measured in accordance with the Standard OCMA - DFCP No. 4, 1973) while stirring in the Hamilton Beach bowl in the "low" position for 10 minutes.

50 g (100 g/l) of an attapulgite (L) (yield 14 to 15 m$^3$/t as measured in accordance with the Standard OCMA - DFCP No. 1, 1973) were then introduced while stirring for 15 minutes.

3.5 g (7 g/l) of a carboxymethyl cellulose (technical low-viscosity CMC complying with the Standard OCMA - DFCP No. Z. 1980) were then introduced while stirring for 15 minutes.

Finally, 60 g (120 g/l) of a low-swelling contaminating native clay (M) (yield 8 to 9 m$^3$/t, as measured in accordance with the Standard OCMA - DFCP No. 4, 1973) were added with stirring for 45 minutes. Throughout the preparation process, the pH was kept at 9.5 by a 50% sodium hydroxide solution.

This preparation was repeated several times, after which the various muds thus prepared were mixed to obtain an homogeneous fluid which, after standing for 24 hours at ambient temperature, formed the base mud treated in steps (B) to (H).

The homogeneous base mud had the following rheological characteristics:

| Apparent viscosity | (A.V.) | 97 |
|---|---|---|
| Plastic viscosity | (P.V.) | 41 |
| Yield point | (Y.P.) | 112 |
| Gels 0/10 | (gels 0/10) | 152/170 |

All these characteristics which are well known to the expert and which are described in detail in the work "Manuel de Rhéologie des Fluides de Forage et Laitiers de Ciment", Edition Technip 1979, were measured with a FANN 35 viscosimeter at 20° C.

Step B 2.5 ml of the thinner to be tested were added to a sample of 500 ml of the base mud, followed by stirring for 10 minutes with the Hamilton Beach in the "low" position.

The pH was adjusted to 9.5, after which the characteristics of this new mud were measured.

Step C

The thinned mud obtained in Step B was hot-rolled for 16 hours at 150° C.

After cooling, the pH was adjusted to 9.5, after which the characteristics of the mud were measured.

Step D

This step consists in weighing the mud with baryte by adding to 500 ml of the mud prepared in Step C 400 g (800 g/l) of barium sulfate corresponding to the Standard OCMA - DFCP No. 3. February 1963. The new density was then 1.65.

The mud was then stirred for 30 minutes in the Hamilton Beach in the "low" position and adjusted to pH 9.5.

A mud densified to a density of 1.65 was thus obtained and its characteristics measured.

Step E

The mud densified in Step D was hot-rolled for 16 hours at 120° C. After cooling, the pH was adjusted to 9.5, after which the characteristics of this new mud were measured.

Step F 2.5 ml (5 l/m$^3$) of the thinner to be tested were added to a sample of 500 ml of the mud hot-rolled in Step E, followed by stirring for 10 minutes with the Hamilton Beach in the "low" position. The pH was then adjusted to 9.5, after which the characteristics of the mud were measured.

Step G 5 l/m³ of the thinner to be tested were added under the same conditions to the mud emanating from Step F.

Step H

Finally, another 5 l/m³ of the thinner to be tested were added under the same conditions as in Step F to the mud emanating from Step G. The process was repeated as many times as dispersing agents, whether belonging to the prior art or corresponding to the invention, were tested.

All the results relating to thinners 1 to 7 are set out in Table II below:

by carrying out Step A. On completion of Step A, the homogeneous base mud had the following rheological characteristics:

| Apparent viscosity | (A.V.) | 122 |
| Plastic viscosity | (P.V.) | 47 |
| Yield point | (Y.P.) | 150 |
| Gels 0/10 | (gels 0/10) | 120/146 |

Two 500 ml samples were taken from this base mud and subjected to Steps B to H in the presence of a dispersing agent according to the prior art (thinner 8) and according to the invention (thinner 9). All the results relating to these two drilling muds are set out in Table III below:

TABLE II

| | | Thinner No. | | | | | | |
|---|---|---|---|---|---|---|---|---|
| | | 1 | 2 | 3 | 4 | 5 | 6 | 7 |
| Rheology | | AA | AA | INV | INV | INV | AA | INV |
| STEP B | | | | | | | | |
| base | A.V. | 42 | 44 | 40 | 40 | 40 | 43 | 40 |
| mud + | P.V. | 24 | 24 | 24 | 23 | 23 | 23 | 22 |
| 5 l/m³ | Y.P. | 36 | 40 | 32 | 34 | 34 | 40 | 36 |
| thinner | Gels 0/10 | 26/137 | 32/140 | 25/119 | 26/130 | 26/121 | 32/125 | 25/110 |
| STEP C | | | | | | | | |
| Step B + | A.V. | 32 | 32 | 30 | 29 | 29 | 32 | 28 |
| 16h-150° C. | P.V. | 14 | 14 | 13 | 13 | 15 | 15 | 11 |
| | Y.P. | 36 | 36 | 34 | 32 | 28 | 34 | 34 |
| | Gels 0/10 | 21/70 | 20/65 | 20/70 | 19/71 | 19/67 | 18/95 | 23/95 |
| STEP D | | | | | | | | |
| Step C + | A.V. | 112 | 108 | 112 | 96 | 100 | 120 | 99 |
| baryta | P.V. | 53 | 59 | 49 | 42 | 46 | 53 | 36 |
| d = 1.65 | Y.P. | 118 | 98 | 126 | 108 | 108 | 134 | 126 |
| | Gels 0/10 | 104/109 | 84/123 | 108/148 | 89/126 | 95/135 | 120/170 | 111/146 |
| STEP E | | | | | | | | |
| Step D + | A.V. | 103 | 108 | 111 | 97 | 98 | 118 | 89 |
| 16h-120° C. | P.V. | 42 | 47 | 46 | 38 | 43 | 47 | 31 |
| | Y.P. | 122 | 122 | 130 | 118 | 110 | 142 | 116 |
| | Gels 0/10 | 105/146 | 70/110 | 47/157 | 96/131 | 98/143 | 110/150 | 100/130 |
| STEP F | | | | | | | | |
| Step E + | A.V. | 103 | 100 | 97 | 85 | 82 | 116 | 61 |
| 5 l/m³ | P.V. | 40 | 38 | 37 | 35 | 35 | 45 | 25 |
| thinner | Y.P. | 126 | 124 | 120 | 100 | 94 | 142 | 72 |
| | Gels 0/10 | 105/145 | 69/105 | 100/135 | 77/111 | 75/112 | 98/132 | 51/98 |
| STEP G | | | | | | | | |
| Step F + | A.V. | 110 | 112 | 95 | 79 | 76 | 112 | 56 |
| 5 l/m³ | P.V. | 44 | 45 | 37 | 33 | 32 | 45 | 23 |
| thinner | Y.P. | 132 | 134 | 116 | 92 | 88 | 134 | 66 |
| | Gels 0/10 | 114/153 | 68/105 | 97/127 | 69/102 | 72/110 | 77/125 | 45/93 |
| STEP H | | | | | | | | |
| Step G + | A.V. | 114 | 116 | 92 | 79 | 73 | 112 | 55 |
| 5 l/m³ | P.V. | 45 | 46 | 35 | 32 | 33 | 45 | 24 |
| thinner | Y.P. | 138 | 140 | 114 | 94 | 80 | 134 | 62 |
| | Gels 0/10 | 120/155 | 78/106 | 93/125 | 70/101 | 66/105 | 75/135 | 41/94 |

Table II shows that the sodium salts of polyacrylic acids are not thinners for drilling muds where they have been densified, whereas these same polymers salified by magnesium produce a significant reduction in the A.V., Y.P. and gel 0 values.

EXAMPLE 3

This Example provides a comparative illustration of the dispersing effect on a drilling mud, of which the aqueous phase is seawater, of a dispersing agent according to the invention consisting of a copolymer of acrylic acid (70%) and acrylamide (30%), in which 60% of the acid functions have been salified by magnesium having an electronegativity of 1.2 and of a dispersing agent corresponding to the prior art formed by the same copolymer, in which 60% of the acid functions have been salified with sodium having an electronegativity of 0.9.

To this end, a drilling mud was first prepared in the laboratory by the method described in Example 2, i.e.

TABLE III

| | | Thinner No. | |
|---|---|---|---|
| | | 8 | 9 |
| Rheology | | AA | INV |
| STEP B | | | |
| base | A.V. | 53 | 51 |
| mud + | P.V. | 22 | 30 |
| 5 l/m³ | Y.P. | 62 | 42 |
| thinner | Gels 0/10 | 70/105 | 34/166 |
| STEP C | | | |
| Step B + | A.V. | 29 | 27 |
| 16h-150° C. | P.V. | 13 | 10 |
| | Y.P. | 32 | 34 |
| | Gels 0/10 | 21/92 | 22/76 |
| STEP D | | | |
| Step C + | A.V. | 92 | 97 |
| baryta | P.V. | 35 | 42 |

TABLE III-continued

| Rheology | | Thinner No. | |
|---|---|---|---|
| | | 8 AA | 9 INV |
| d = 1.65 | Y.P. | 114 | 110 |
| | Gels 0/10 | 117/174 | 99/134 |
| STEP E | | | |
| Step D + | A.V. | 104 | 92 |
| 16h-120° C. | P.V. | 42 | 36 |
| | Y.P. | 124 | 112 |
| | Gels 0/10 | 123/193 | 91/125 |
| STEP F | | | |
| Step E + | A.V. | 102 | 84 |
| 5 l/m³ | P.V. | 35 | 33 |
| thinner | Y.P. | 134 | 102 |
| | Gels 0/10 | 130/184 | 86/115 |
| STEP G | | | |
| Step F + | A.V. | 104 | 79 |
| 5 l/m³ | P.V. | 30 | 30 |
| thinner | Y.P. | 148 | 98 |
| | Gels 0/10 | 146/172 | 80/109 |
| STEP H | | | |
| Step G + | A.V. | 112 | 80 |
| 5 l/m³ | P.V. | 39 | 32 |
| thinner | Y.P. | 146 | 96 |
| | Gels 0/10 | 160/182 | 83/112 |

Table III shows that, for the same dose of dispersing agent, the drilling mud containing the agent according to the invention shows very much better rheological behavior than the drilling mud containing the dispersing agent according to the prior art.

EXAMPLE 4

This Example illustrates the dispersing effect of the agent according to the invention in a drilling mud of which the aqueous phase is seawater.

To this end, a drilling mud (base mud) was first prepared in a laboratory by the same method as in Example 2, i.e. by carrying out Step A. On completion of this step, the base mud had the following rheological characteristics:

| Apparent viscosity | (A.V.) | 98 |
|---|---|---|
| Plastic viscosity | (P.V.) | 45 |
| Yield point | (Y.P.) | 106 |
| Gels 0/10 | (gels 0/10) | 147/169 |

Nine 500 ml samples were taken from this base mud and then subjected to Steps B to H of the method described in Example 2 in the presence of a dispersing agent.

Each dispersing agent used was a copolymer of acrylic acid (65%), acrylamide (15%) and the phosphoric ester of ethylene glycol methacrylate (20%), of which the acid functions were completely or partly salified:

by sodium (thinners 10, 11 and 16) constituting the prior-art agents, by a metal having an electronegativity above 0.95 (thinners 12, 13, 14, 15, 17 and 18) constituting the agents according to the invention.

All the results relating to these drilling muds are set out in Table IV below:

TABLE IV

| | | Thinner No. | | | | | | | | |
|---|---|---|---|---|---|---|---|---|---|---|
| | | 10 AA | 11 AA | 12 INV | 13 INV | 14 INV | 15 INV | 16 AA | 17 INV | 18 INV |
| STEP B | | | | | | | | | | |
| base | A.V. | 45 | 48 | 43 | 43 | 43 | 43 | 60 | 46 | 52 |
| mud + | P.V. | 29 | 28 | 27 | 26 | 27 | 27 | 32 | 27 | 27 |
| 5 l/m³ | Y.P. | 32 | 40 | 32 | 34 | 32 | 32 | 56 | 38 | 50 |
| thinner | Gels 0/10 | 30/121 | 88/112 | 21/134 | 21/130 | 50/120 | 54/126 | 46/198 | 30/184 | 35/192 |
| STEP C | | | | | | | | | | |
| Step B + | A.V. | 26 | 26 | 24 | 24 | 24 | 26 | 39 | 28 | 28 |
| 16h/150° C. | P.V. | 12 | 12 | 12 | 13 | 14 | 13 | 16 | 15 | 15 |
| | Y.P. | 28 | 28 | 24 | 22 | 20 | 26 | 46 | 26 | 26 |
| | Gels 0/10 | 19/67 | 19/80 | 18/75 | 19/82 | 18/72 | 18/75 | 25/82 | 20/61 | 17/73 |
| STEP D | | | | | | | | | | |
| Step C + | A.V. | 93 | 90 | 87 | 87 | 81 | 88 | 129 | 127 | 99 |
| baryta | P.V. | 40 | 41 | 44 | 43 | 39 | 40 | 65 | 63 | 52 |
| d = 1.65 | Y.P. | 106 | 98 | 86 | 88 | 84 | 96 | 128 | 128 | 94 |
| | Gels 0/10 | 92/132 | 84/123 | 83/130 | 82/126 | 97/129 | 96/130 | 154/206 | 133/182 | 82/145 |
| STEP E | | | | | | | | | | |
| Step D + | A.V. | 96 | 81 | 80 | 81 | 76 | 89 | 138 | 122 | 82 |
| 16h-120° C. | P.V. | 40 | 32 | 38 | 38 | 34 | 36 | 65 | 58 | 40 |
| | Y.P. | 112 | 98 | 84 | 86 | 84 | 106 | 146 | 128 | 84 |
| | Gels 0/10 | 97/147 | 75/111 | 68/126 | 66/124 | 91/120 | 93/124 | 150/185 | 125/170 | 28/129 |
| STEP F | | | | | | | | | | |
| Step E + | A.V. | 80 | 72 | 70 | 72 | 65 | 72 | 117 | 96 | 76 |
| 5 l/m³ | P.V. | 32 | 28 | 35 | 36 | 30 | 32 | 48 | 44 | 38 |
| thinner | Y.P. | 96 | 88 | 70 | 72 | 70 | 80 | 138 | 104 | 76 |
| | Gels 0/10 | 78/129 | 69/103 | 40/115 | 50/120 | 70/102 | 55/115 | 110/172 | 97/145 | 65/111 |
| STEP G | | | | | | | | | | |
| Step F + | A.V. | 82 | 73 | 69 | 68 | 62 | 72 | 123 | 82 | 75 |
| 5 l/m³ | P.V. | 34 | 28 | 36 | 36 | 32 | 34 | 52 | 36 | 39 |
| thinner | Y.P. | 96 | 90 | 66 | 64 | 60 | 76 | 142 | 92 | 72 |
| | Gels 0/10 | 86/125 | 68/105 | 46/108 | 45/100 | 45/102 | 51/106 | 118/176 | 73/126 | 53/109 |
| STEP H | | | | | | | | | | |
| Step G + | A.V. | 80 | 79 | 68 | 68 | 61 | 67 | 122 | 80 | 78 |
| 5 l/m³ | P.V. | 33 | 32 | 37 | 37 | 33 | 34 | 50 | 38 | 42 |
| thinner | Y.P. | 94 | 94 | 62 | 62 | 56 | 66 | 144 | 84 | 72 |
| | Gels 0/10 | 80/125 | 78/105 | 45/107 | 44/100 | 40/97 | 47/102 | 124/170 | 64/126 | 46/109 |

Table IV confirms that, for the same dose of dispersing agent, the drilling mud containing the agent according to the invention shows very much better rheological behavior than the mud containing the dispersing agent according to the prior art.

However, Table IV also shows that the dispersing effect of the agent according to the invention in the drilling muds is greater, the higher the electronegativity of the salifying metal, even with polyvalent cations, such as the magnesium reputed to be particularly troublesome in drilling muds according to the prior art.

EXAMPLE 5

This Example illustrates the dispersing effect of the agent according to the invention in a drilling mud of which the aqueous phase is seawater by comparison with a dispersing effect belonging to the prior art.

The dispersing agent belonging to the prior art (26 in Table I) is an alkaline acrylic copolymer of the type marketed under the name ALCOMER 75L by Allied Colloids.

The dispersing agent according to the invention (27 in Table I) is the same alkaline acrylic copolymer AL-COMER 75L modified by Applicants by elimination of the alkaline cation by passage over a cation exchange resin and then by transformation of the acid copolymers into a magnesium salt having an electronegativity of from 1.2 to 1.3.

To this end, a drilling mud was prepared in the laboratory by the same method as in Example 2, i.e. by carrying out Step A. On completion of Step A, the homogeneous base mud had the following rheological characteristics:

| Apparent viscosity | (A.V.) | 73 |
|---|---|---|
| Plastic viscosity | (P.V.) | 27 |
| Yield point | (Y.P.) | 92 |
| Gels 0/10 | (gels 0/10) | 71/93 |

Nine 500 ml samples were taken from this base mud and then subjected to Steps B to H in the presence of the dispersing agent according to the prior art (thinner 26) and according to the invention (thinner 27).

All the results relating to these two drilling muds are set out in Table V below:

TABLE V

| | | Thinner No. | |
|---|---|---|---|
| | | 26 | 27 |
| Rheology | | AA | INV |
| STEP B | | | |
| base | A.V. | 32 | 30 |
| mud + | P.V. | 17 | 18 |
| 5 l/m³ | Y.P. | 30 | 24 |
| thinner | Gels 0/10 | 19/96 | 20/83 |
| STEP C | | | |
| Step B + | A.V. | 34 | 27 |
| 16h-150° C. | P.V. | 9 | 12 |
| | Y.P. | 50 | 30 |
| | Gels 0/10 | 28/62 | 19/64 |
| STEP D | | | |
| Step C + | A.V. | 85 | 68 |
| baryta | P.V. | 30 | 28 |
| d = 1.65 | Y.P. | 110 | 80 |
| | Gels 0/10 | 91/121 | 54/101 |
| STEP E | | | |
| Step D + | A.V. | 99 | 75 |
| 16h-120° C. | P.V. | 36 | 26 |
| | Y.P. | 126 | 98 |
| | Gels 0/10 | 108/136 | 72/107 |

TABLE V-continued

| | | Thinner No. | |
|---|---|---|---|
| | | 26 | 27 |
| Rheology | | AA | INV |
| STEP F | | | |
| Step E + | A.V. | 89 | 63 |
| 5 l/m³ | P.V. | 31 | 25 |
| thinner | Y.P. | 116 | 76 |
| | Gels 0/10 | 103/128 | 53/87 |
| STEP G | | | |
| Step F + | A.V. | 92 | 56 |
| 5 l/m³ | P.V. | 32 | 23 |
| thinner | Y.P. | 120 | 66 |
| | Gels 0/10 | 107/127 | 58/82 |
| STEP H | | | |
| Step G + | A.V. | 92 | 56 |
| 5 l/m³ | P.V. | 29 | 22 |
| thinner | Y.P. | 126 | 68 |
| | Gels 0/10 | 108/131 | 46/84 |

Table V shows that, for the same dose of dispersing agent, the drilling mud containing the agent according to the invention shows very much better rheological behavior from Step D than the drilling mud containing the dispersing agent belonging to the prior art.

EXAMPLE 6

This Example illustrates the dispersing effect of the agent according to the invention in a drilling mud of which the aqueous phase is freshwater by comparison with a dispersing agent belonging to the prior art.

The dispersing agent belonging to the prior art is an acrylic acid polymer (thinner 2 in Table I) salified by sodium having an electronegativity of 0.9.

The dispersing agent according to the invention is the same acrylic acid polymer (thinner 5) salified by magnesium having an electronegativity of from 1.2 to 1.3.

To make this comparison between the dispersing agents, a drilling mud was first prepared in the laboratory by the same method as in Example 2, except that Step A was carried out as follows:

Step A

The base mud was prepared as follows by pouring 500 ml of freshwater (TH 25°) into the bowl of a Hamilton Beach and then adding 25 g (50 g/l) of a bentonite (K) (yield 18 to 20 m³/t, as measured in accordance with the Standard OCMA - DFCP No. 4, 1973) while stirring in the "low" position for 10 minutes.

3.5 g (7 g/l) of a carboxymethyl cellulose (technical low-viscosity CMC complying with the Srandard OCMA - DFCP No 2, 1980) were then introduced while stirring for 15 minutes.

Finally, 60 g (120 g/l) of a low-swelling contaminating native clay (M) (yield 8 to 9 m³/t as measured in accordance with the Standard OCMA - DFCP No. 4, 1973) were added while stirring for 45 minutes. Throughout the preparation process, the pH was adjusted to 9.5 with a 50% sodium hydroxide solution.

This preparation was repeated several times, after which the various muds thus prepared were mixed to obtain a homogeneous fluid which, after standing for 24 hours at ambient temperature, constituted the base mud treated in Steps (B) to (H).

The homogeneous base mud had the following rheological characteristics:

| Apparent viscosity | (A.V.) | 131 |
|---|---|---|

| | | |
|---|---|---|
| Plastic viscosity | (P.V.) | 47 |
| Yield point | (Y.P.) | 168 |
| Gels 0/10 | (gels 0/10) | 127/215 |

Two 500 ml samples were taken from the base mud and subjected to Steps (B) to (H) in the presence of the dispersing agent according to the prior art (2) and to the invention (5).

All the results relating to these two drilling muds are set out in Table VI below:

TABLE VI

| | | Thinner No. | |
|---|---|---|---|
| Rheology | | 2 AA | 5 INV |
| STEP B | | | |
| base | A.V. | 57 | 52 |
| mud + | P.V. | 36 | 35 |
| 5 l/m³ | Y.P. | 42 | 34 |
| thinner | Gels 0/10 | 16/26 | 10/25 |
| STEP C | | | |
| Step B + | A.V. | 48 | 28 |
| 16h-150° C. | P.V. | 32 | 20 |
| | Y.P. | 32 | 16 |
| | Gels 0/10 | 10/16 | 5/9 |
| STEP D | | | |
| Step C + | A.V. | 74 | 50 |
| baryta | P.V. | 48 | 36 |
| d = 1.65 | Y.P. | 52 | 28 |
| | Gels 0/10 | 16/25 | 7/13 |
| STEP E | | | |
| Step D + | A.V. | 107 | 67 |
| 16h-120° C. | P.V. | 70 | 47 |
| | Y.P. | 74 | 40 |
| | Gels 0/10 | 22/35 | 11/19 |
| STEP F | | | |
| Step E + | A.V. | 94 | 62 |
| 5 l/m³ | P.V. | 61 | 44 |
| thinner | Y.P. | 66 | 36 |
| | Gels 0/10 | 22/32 | 12/20 |
| STEP G | | | |
| Step F + | A.V. | 92 | 62 |
| 5 l/m³ | P.V. | 58 | 42 |
| thinner | Y.P. | 68 | 40 |
| | Gels 0/10 | 24/35 | 13/23 |
| STEP H | | | |
| Step G + | A.V. | 94 | 64 |
| 5 l/m³ | P.V. | 57 | 42 |
| thinner | Y.P. | 74 | 44 |
| | Gels 0/10 | 27/41 | 15/27 |

Table VI confirms that, for the same dose of dispersing agent, the drilling mud based on freshwater containing the agent according to the invention shows very much better rheological behavior than the same mud containing the dispersing agent belonging to the prior art.

EXAMPLE 7

This Example illustrates the dispersing effect of the agent according to the invention in a so-called heavy drilling mud of which the aqueous phase is seawater (taken from the Mediterranean) and the densifying agent is calcium carbonate (of the type marketed under the name DURCAL 15 by OMYA).

To this end, a drilling mud (so-called base mud) was first prepared in the laboratory in accordance with Step A of the method described in Example 2.

On completion of Step A, the base mud had the following rheological characteristics:

| | | |
|---|---|---|
| Apparent viscosity | (A.V.) | 73 |
| Plastic viscosity | (P.V) | 27 |
| Yield point | (Y.P.) | 92 |
| Gels 0/10 | (gels 0/10) | 71/93 |

Two 500 ml samples were taken from this base mud and subjected to Steps (B) to (H) of the method described in Example 2 in the presence of a dispersing agent, bearing in mind that Step D in this Example comprises the introduction of $CaCO_3$ instead of the barium sulfate used in Example 2 in a quantity of 260 g of $CaCO_3$ corresponding to a charge by volume identical with that of the barium sulfate. The density of the mud was 1.40.

Each dispersing agent used was a copolymer of acrylic acid (65%), acrylamide (15%) and a phosphoric ester of ethylene glycol methacrylate (20%), of which the acid functions had been partially salified:
- with sodium (thinner 11) constituting the agent belonging to the prior art,
- with magnesium (thinner 12) constituting the agent according to the invention.

All the results relating to these drilling muds are set out in the Table VII below:

TABLE VII

| | | Thinner No. | |
|---|---|---|---|
| Rheology | | 11 AA | 12 INV |
| STEP B | | | |
| base | A.V. | 31 | 29 |
| mud + | P.V. | 18 | 18 |
| 5 l/m³ | Y.P. | 26 | 22 |
| thinner | Gels 0/10 | 20/81 | 16/74 |
| STEP C | | | |
| Step B + | A.V. | 26 | 23 |
| 16h-150° C. | P.V. | 11 | 12 |
| | Y.P. | 30 | 22 |
| | Gels 0/10 | 20/65 | 16/54 |
| STEP D | | | |
| Step C + | A.V. | 67 | 55 |
| $CaCO_3$ | P.V. | 27 | 23 |
| d = 1.40 | Y.P. | 80 | 64 |
| | Gels 0/10 | 61/98 | 43/89 |
| STEP E | | | |
| Step D + | A.V. | 75 | 59 |
| 16h-120° C. | P.V. | 30 | 24 |
| | Y.P. | 89 | 70 |
| | Gels 0/10 | 66/89 | 44/84 |
| STEP F | | | |
| Step E + | A.V. | 69 | 51 |
| 5 l/m³ | P.V. | 26 | 22 |
| thinner | Y.P. | 86 | 58 |
| | Gels 0/10 | 65/95 | 36/73 |
| STEP G | | | |
| Step F + | A.V. | 69 | 50 |
| 5 l/m³ | P.V. | 25 | 22 |
| thinner | Y.P. | 88 | 56 |
| | Gels 0/10 | 65/95 | 35/79 |
| STEP H | | | |
| Step G + | A.V. | 72 | 49 |
| 5 l/m³ | P.V. | 25 | 23 |
| thinner | Y.P. | 94 | 52 |
| | Gels 0/10 | 72/100 | 33/75 |

Table VII confirms that, for the same dose of dispersing agent, the drilling mud based on seawater (densifying agent calcium carbonate) containing the dispersing agent according to the invention shows considerably better rheological behavior than the same drilling mud containing the dispersing agent belonging to the prior art.

EXAMPLE 8

Through FIG. 1, this Example provides a comparative illustration based on a mud taken from a well—of the improvement brought about by the dispersing agent according to the invention when they are used in so-called heavy drilling muds and demonstrates the increasing dispersing effect associated with the increase in the electronegativity of the metal salifying the acid functions of the polymers and/or copolymers used in accordance with the invention.

The seawater base mud (free from baryta and dispersant) came from a drilling site and, accordingly, had worked, i.e. had circulated in the bore hole and had become charged with clay emanating from the actual formation.

This base mud, which had a density of 1.12, had the following rheological characteristics:

| | | |
|---|---|---|
| Apparent viscosity | (A.V.) | 22 |
| Plastic viscosity | (P.V.) | 14 |
| Yield point | (Y.P.) | 16 |
| Gels 0/10 | (gels 0/10) | 7/24 |

Nine 500 ml samples were taken from this base mud and subjected to Steps (D) to (H) of the method described in Example 2 in the presence of a dispersing agent, Steps (A), (B) and (C) being omitted in view of the origin of the base mud.

Each dispersing agent used was a copolymer of acrylic acid (65%), acrylamide (15%) and a phosphoric ester of ethylene glycol methacrylate (20%) of which the acid functions had been partially salified:
by a metal having an electronegativity below 0.95 (sodium, potassium, barium) (thinners 11, 19, 20) constituting the agent belonging to the prior art,
by a metal having an electronegativity greater than 0.95 (lithium, calcium, magnesium, manganese, zinc, copper) (thinners 21, 22, 12, 23, 24, 25) constituting the agent according to the invention.

All the results relating to these drilling muds are set out in Table VIII below:

TABLE VIII

| | | Thinner No. | | | | | | | | |
|---|---|---|---|---|---|---|---|---|---|---|
| | | 19 AA | 11 AA | 20 AA | 21 INV | 22 INV | 12 INV | 23 INV | 24 INV | 25 INV |
| | | | | | Electronegativity | | | | | |
| Rheology | | 0.8 | 0.9 | 0.9 | 1.0 | 1.0 | 1.2 | 1.5 | 1.6 | 1.9 |
| STEP D | | | | | | | | | | |
| base | A.V. | 61 | 61 | 61 | 61 | 61 | 61 | 61 | 61 | 61 |
| mud + | P.V. | 36 | 36 | 36 | 36 | 36 | 36 | 36 | 36 | 36 |
| baryta | Y.P. | 50 | 50 | 50 | 50 | 50 | 50 | 50 | 50 | 50 |
| d = 1.70 | Gels 0/10 | 33/91 | 33/91 | 33/91 | 33/91 | 33/91 | 33/91 | 33/91 | 33/91 | 33/91 |
| STEP E | | | | | | | | | | |
| Step B + | A.V. | 82 | 82 | 82 | 82 | 82 | 82 | 82 | 82 | 82 |
| 16h-120° C. | P.V. | 56 | 56 | 56 | 56 | 56 | 56 | 56 | 56 | 56 |
| | Y.P. | 52 | 52 | 52 | 52 | 52 | 52 | 52 | 52 | 52 |
| | Gels 0/10 | 36/84 | 36/84 | 36/84 | 36/84 | 36/84 | 36/84 | 36/84 | 36/84 | 36/84 |
| STEP F | | | | | | | | | | |
| Step C + | A.V. | 59 | 58 | 59 | 58 | 57 | 54 | 52 | 55 | 51 |
| 5 l/m³ | P.V. | 33 | 33 | 34 | 34 | 34 | 34 | 35 | 34 | 34 |
| thinner | Y.P. | 52 | 50 | 50 | 48 | 46 | 40 | 34 | 42 | 34 |
| | Gels 0/10 | 36/96 | 33/95 | 33/93 | 36/86 | 30/76 | 33/75 | 23/90 | 31/92 | 29/92 |
| STEP G | | | | | | | | | | |
| Step D + | A.V. | 60 | 58 | 61 | 58 | 57 | 51 | 47 | 49 | 46 |
| 5 l/m³ | P.V. | 32 | 31 | 34 | 34 | 33 | 34 | 34 | 32 | 32 |
| thinner | Y.P. | 56 | 54 | 54 | 48 | 48 | 34 | 26 | 34 | 28 |
| | Gels 0/10 | 35/97 | 34/94 | 35/95 | 37/92 | 45/97 | 28/75 | 18/75 | 23/90 | 22/73 |
| STEP H | | | | | | | | | | |
| Step E + | A.V. | 65 | 62 | 62 | 60 | 59 | 50 | 44 | 47 | 45 |
| 5 l/m³ | P.V. | 32 | 31 | 31 | 32 | 32 | 34 | 32 | 32 | 32 |
| thinner | Y.P. | 66 | 62 | 62 | 56 | 54 | 32 | 24 | 30 | 26 |
| | Gels 0/10 | 44/101 | 43/97 | 40/95 | 43/98 | 45/85 | 21/78 | 15/73 | 20/85 | 20/86 |

Table VII confirms that, for the same dose of dispersing agent, the drilling mud containing the agent according to the invention shows much better rheological behavior than the drilling mud containing the dispersing agent belonging to the prior art.

However, Table VIII also shows that the dispersing effect of the agent according to the invention in drilling muds is greater, the higher the electronegativity of the salifying metal, even with polyvalent cations, such as magnesium and manganese, reputed to be particularly troublesome in drilling muds according to the prior art.

FIG. 1 which is taken from Table VIII and which illustrates this Example, interestingly shows that the development of the yield point has a function of the various treatment steps to which the mud is subjected is characteristic of the electronegativity of the salifying metal of the polymers and/or copolymers containing acid functions. The curves relating to sodium, potassium and barium (electronegativity below 0.95) constitute a homogeneous group of which the yield point increases as a function of the successive treatment steps to which the mud is subjected, i.e. of which the dispersing effect disappears very quickly in densified muds.

The curves relating to the metals having an electronegativity above 0.95 constitute a group which, although homogeneous, shows a yield point decreasing rapidly as a function of the successive treatment steps to which the mud is subjected, i.e. of which the dispersing effect gradually improves in densified muds.

EXAMPLE 9

This Example illustrates the inhibiting effect on the swelling of the clays in drilling muds based on seawater by virtue of the presence of the dispersing agent according to the invention. To this end and in accordance with Step (A), a drilling mud (so-called base mud) was first prepared as follows:

Step A 2000 ml of natural seawater (taken from the Mediterranean in the Golfe de Lion) are poured into a 5-liter container. 8 g (4 g/l) of technical sodium carbonate were then added with stirring (50 mm diameter Rayneri turbine rotating at 1500 r.p.m.) to precipitate the $Ca^{2+}$ and $Mg^{2+}$ ions.

60 g (30 g/l) of a bentonite (K) (yield 18 to 20 $m^3/t$, as measured in accordance with the Standard OCMA - DFCP No. 4, 1973) and 120 g (i.e. 60 g/l) of an attapulgite (L) (yield 14 to 15 $m^3/t$, as measured in accordance with the Standard OCMA - DFCP No. 1, 1973) were then simultaneously introduced into the medium while stirring for 20 minutes. Finally, 14 g (7 g/l) of carboxymethyl cellulose (technical low-viscosity CMC complying with the Standard OCMA - DFCP No. 2. 1980) were introduced into this medium while stirring for 30 minutes.

Throughout this preparation, the pH value of the medium was monitored and corrected with a sodium hydroxide solution in such a way that it remained at 9.5.

Step B

The base mud prepared in Step (A) was divided into 500 ml batches. The dispersing agent was added in two different concentrations to one 500 ml batch while stirring for 10 minutes (Hamilton Beach, "low" position). The pH was adjusted to 9.5.

Step C 100 g (200 g/l) of a contaminating native clay (M) were added with stirring (Hamilton Beach, "low" position) to 500 ml of the mud emanating from Step (B) and containing the dispersing agent, stirring being continued for 30 minutes during which the pH was adjusted to 9.5.

After standing for 24 hours at ambient temperature, the mud was stirred for another 5 minutes and the pH value adjusted to 9.5, after which the characteristics were measured.

Step D

The mud emanating from Step (C) was hot rolled to a temperature of 120° C. for 16 hours.

After cooling, the hot-rolled mud was stirred for another 5 minutes and the pH adjusted to 9.5, after which its characteristics were measured.

The process comprising Steps (B) to (D) was repeated as many times as the dispersing agents and the concentrations of dispersing agents used, whether corresponding to the prior art or to the invention, were tested.

All the results relating to dispersing agents 11 (prior art) and 12 (invention) are set out in Table IX below:

TABLE IX

| | | Thinner No. | | | |
|---|---|---|---|---|---|
| | | 11 AA | | 12 INV | |
| | | Conc. l/m³ | | | |
| Rheology | | 5 | 10 | 5 | 10 |
| base mud + | A.V. | 39 | 29 | 40 | 29 |
| thinner + | P.V. | 25 | 24 | 27 | 23 |
| contaminating | Y.P. | 28 | 10 | 26 | 12 |
| native clay | Gels 0/10 | 28/112 | 4/54 | 26/70 | 5/51 |
| | Filtrate API cm³ | 10.5 | 8.5 | 9.5 | 7.5 |
| After rolling | A.V. | 35 | 28 | 35 | 35 |
| 16h-120° C. | P.V. | 23 | 20 | 26 | 27 |
| | Y.P. | 24 | 16 | 18 | 16 |
| | Gels 0/10 | 47/130 | 7/67 | 15.78 | 9/62 |
| | Filtrate API cm³ | 11 | 9 | 9.5 | 8.5 |

Table IX shows the dispersing agent according to the invention is really effective in inhibiting the swelling of clays.

Table IX also shows the universal character of the dispersing agent according to the invention because, apart from being a highly effective thinner, it is also very effective in inhibiting the increase in viscosity which low-density muds undergo when contaminated by clays.

EXAMPLE 10

This Example illustrates the inhibiting effect on the swelling of clays in drilling muds based on natural freshwater having a hardness of 25° TH (French hardness) attributable to the presence of the dispersing agent according to the invention.

To this end, and in accordance with Step (A), a drilling mud (so-called base mud) was initially prepared as follows:

Step A 2000 ml of freshwater (TH 25°) were poured into a 5-liter container. 100 g (50 g/l) of a bentonite (K) (yield 18 to 20 $m^3/t$, as measured in accordance with the Standard OCMA - DFCP No. 4, 1973) were then added with stirring (Rayneri turbine, 50 mm in diameter, rotating at 1500 r.p.m.), stirring being continued for 30 minutes.

Throughout this preparation, the pH of the medium was monitored and corrected with a sodium hydroxide solution so that it remained at 9.5.

This base mud was then subjected to the same treatments as described in Steps (B), (C) and (D) of Example 9 In the presence of dispersing agents according to the prior art (II) and to the invention (12) in two different concentrations.

All the results relating to the dispersing agents according to the prior art (11) and to the invention (12) are set out in Table X below:

TABLE X

| | | Thinner No. | | | |
|---|---|---|---|---|---|
| | | 11 AA | | 12 INV | |
| | | Conc. l/m³ | | | |
| Rheology | | 5 | 10 | 5 | 10 |
| base mud + | A.V. | 22 | 22 | 23 | 16 |
| thinner + | P.V. | 16 | 18 | 18 | 13 |
| contaminating | Y.P. | 12 | 8 | 10 | 6 |
| native clay | Gels 0/10 | 3/58 | 3/27 | 4/59 | 2/6 |
| | Filtrate API cm³ | 6.5 | 5 | 7 | 6.6 |
| After rolling | A.V. | 40 | 32 | 41 | 20 |
| 16h-120° C. | P.V. | 22 | 23 | 24 | 15 |
| | Y.P. | 36 | 18 | 34 | 10 |
| | Gels 0/10 | 13/81 | 4/30 | 12/35 | 3/11 |

TABLE X-continued

|  | Thinner No. | | | |
| --- | --- | --- | --- | --- |
|  | 11 AA | | 12 INV | |
|  | Conc. l/m³ | | | |
| Rheology | 5 | 10 | 5 | 10 |
| Filtrate API cm³ | 4.8 | 4.2 | 5.5 | 4.9 |

The results set out in Table X confirm that the dispersing agent according to the invention inhibits the swelling of the clays present in the drilling muds based on freshwater.

Table X also shows the universal character of the dispersing agent according to the invention because, in addition to being an effective thinner, it is also effective in inhibiting the increase in viscosity which low-density muds undergo when they are contaminated by clays.

EXAMPLE 11

This Example illustrates the dispersing effect of the agent according to the invention in so-called heavy drilling muds which contain both clays and barium sulfate (baryta) in large amounts and of which the aqueous phase is water saturated with NaCl.

To this end, and in accordance with the method described in Example 2, Step (A), a base mud was prepared by pouring 500 ml of a saturated brine prepared from freshwater and technical sodium chloride into the bowl of a Hamilton Beach. 37.5 g (75 g/l) of an attapulgite (L) (conforming to the Standard OCMA - DFCP No. 1, 1973) were then added with stirring ("low" position), stirring being continued for 30 minutes during which the pH value was adjusted to 10 with a 50% NaOH solution.

50 g (100 g/l) of a contaminating native clay (M) were then introduced with stirring ("low" position), stirring being continued for one hour during which the pH value was adjusted to 10.

This operation was repeated several times, after which the various muds thus prepared were mixed to obtain a homogeneous fluid which, after ageing for 24 hours at ambient temperature, constituted the reserve of base mud used in Steps (8) to (H) as described in Example 2. The homogeneous base mud had the following rheological characteristics:

| Apparent viscosity | (A.V.) | 71 |
| --- | --- | --- |
| Plastic viscosity | (P.V.) | 17 |
| Yield point | (Y.P.) | 108 |
| Gels 0/10 | (gels 0/10) | 35/36 |

Two 500 ml samples were then taken to test the effectiveness of the dispersing agent according to the invention (12) by comparison with a dispersing agent belonging to the prior art (11) used in the same concentrations.

The two samples were subjected to Steps (B) to (H) described in Example 2, i.e. 400 g of barium sulfate was added to each of them in Step (D), giving densified muds having a density of 1.75.

All the results relating to the dispersing agents (11) and (12) are set out in Table XI below:

TABLE XI

|  |  | Thinner No. | |
| --- | --- | --- | --- |
|  |  | 11 AA | 12 INV |
| STEP B | | | |
| base mud + 5 l/m³ thinner | A.V. | 16 | 14 |
|  | P.V. | 5 | 8 |
|  | Y.P. | 22 | 12 |
|  | Gels 0/10 | 17/42 | 22/45 |
| STEP C | | | |
| Step B + 16h-150° C. | A.V. | 15 | 12 |
|  | P.V. | 6 | 6 |
|  | Y.P. | 18 | 12 |
|  | Gels 0/10 | 20/55 | 13/44 |
| STEP D | | | |
| Step C + baryta d = 1.65 | A.V. | 62 | 46 |
|  | P.V. | 12 | 8 |
|  | Y.P. | 100 | 76 |
|  | Gels 0/10 | 38/67 | 50/56 |
| STEP E | | | |
| Step D + 16h-120° C. | A.V. | 63 | 54 |
|  | P.V. | 13 | 14 |
|  | Y.P. | 100 | 80 |
|  | Gels 0/10 | 76/107 | 60/82 |
| STEP F | | | |
| Step E + 5 l/m³ thinner | A.V. | 57 | 37 |
|  | P.V. | 15 | 21 |
|  | Y.P. | 84 | 32 |
|  | Gels 0/19 | 78/90 | 44/108 |
| STEP G | | | |
| Step F + 5 l/m³ thinner | A.V. | 50 | 31 |
|  | P.V. | 14 | 21 |
|  | Y.P. | 72 | 20 |
|  | Gels 0/10 | 56/80 | 24/71 |
| STEP H | | | |
| Step G + 5 l/m³ thinner | A.V. | 51 | 30 |
|  | P.V. | 14 | 21 |
|  | Y.P. | 74 | 18 |
|  | Gels 0/10 | 55/77 | 11/58 |

For this type of highly densified mud of which the liquid phase is a saturated salt water, Table XI shows the very considerable improvement in the rheological characteristics of the densified drilling muds treated with the agents (12) according to the invention by comparison with those of the densified drilling mud containing the dispersing agent according to the prior art (11) (Steps F to H).

We claim:

1. A method of stabilizing the rheological properties of drilling fluids, comprising the steps of:
    i) obtaining an aqueous drilling fluid; and
    ii) adding to said aqueous drilling fluid an amount of a dispersing agent sufficient to maintain the fluid viscosity properties of said drilling fluid at the temperature and pressure conditions which occur during drilling,
    wherein said dispersing agent comprises an acid function containing polymer salt or copolymer salt, wherein said salt is prepared by reacting an acid function containing polymer or copolymer with an oxide or hydroxide salt selected from the group consisting of magnesium hydroxide, zinc hydroxide, copper hydroxide and manganese oxide.

2. The method of claim 1, wherein said polymer salt or copolymer salt comprises an acid function selected from the group consisting of carboxylic, hydroxamic, sulfuric, sulfonic, phosphoric and phosphonic acid functions.

3. The method of claim 1, wherein said polymer salt or copolymer salt has a specific viscosity at most equal to 9.0.

4. The method of claim 1, wherein said specific viscosity is from 0.2-3.0.

5. The method of claim 1, wherein said specific viscosity is from 0.3-1.5.

6. The method of claim 1, wherein said polymer salt or copolymer salt comprises a plurality of salifying cations, each cation corresponding to a metal having a Pauling electronegativity greater than 1.0.

7. The method of claim 1, wherein said salifying cation is selected from cations corresponding to metals having a Pauling electronegativity of from greater than 1.0 to 2.0.

8. The method of claim 7, wherein said salifying cation is selected from the group of cations corresponding to metals having a Pauling electronegativity of 1.2-1.9.

9. The method of claim 1, wherein at least 5% of said acid functions on said polymer salt or copolymer salt are salified by said salifying cation.

10. The method of claim 9, wherein from 20-80% of said acid functions on said polymer salt or copolymer salt are salified.

11. The method of claim 1, wherein said drilling fluid comprises a saline drilling fluid.

12. A method of stabilizing the rheological properties of drilling fluid, comprising the steps of:
  i) obtaining aqueous drilling fluid; and
  ii) adding to said aqueous drilling fluid an amount of a dispersing agent sufficient to maintain the fluid viscosity properties of said drilling fluid at the temperature and pressure conditions which occur during drilling,
  wherein said dispersing agent comprises an acid function containing polymer salt or copolymer salt, wherein said salt comprises at least the cation aluminum.

13. A method of stabilizing the rheological properties of drilling fluid, comprising the steps of:
  i) obtaining aqueous drilling fluid; and
  ii) adding to said aqueous drilling fluid an amount of a dispersing agent sufficient to maintain the fluid viscosity properties of said drilling fluid at the temperature and pressure conditions which occur during drilling,
  wherein said dispersing agent comprises an acid function containing polymer salt or copolymer salt, wherein said salt comprises at least the cation magnesium.

14. A method of stabilizing the rheological properties of drilling fluid, comprising the steps of:
  i) obtaining aqueous drilling fluid; and
  ii) adding to said aqueous drilling fluid an amount of a dispersing agent sufficient to maintain the fluid viscosity properties of said drilling fluid at the temperature and pressure conditions which occur during drilling,
  wherein said dispersing agent comprises an acid function containing polymer salt or copolymer salt, wherein said salt is prepared by reacting an acid function containing polymer or copolymer with zinc hydroxide.

* * * * *